United States Patent [19]

Klein

[11] 4,308,823
[45] Jan. 5, 1982

[54] KNOT PASSING COATING APPARATUS

[75] Inventor: Norman E. Klein, Inman, S.C.

[73] Assignee: Milliken Research Corporation, Spartanburg, S.C.

[21] Appl. No.: 893,518

[22] Filed: Apr. 4, 1978

[51] Int. Cl.³ .............................................. B05C 3/02
[52] U.S. Cl. ........................... 118/670; 118/DIG. 22; 118/70; 118/405; 118/672
[58] Field of Search ................. 118/405, 8, 4, 18, 670, 118/DIG. 22, 70, 672; 28/227, 228

[56] References Cited

U.S. PATENT DOCUMENTS 2,960,062 11/1960 Martuch .............................. 118/102
4,095,063 6/1978 Herzhoff et al. ........................ 118/8

Primary Examiner—Bernard D. Pianalto
Attorney, Agent, or Firm—Earle R. Marden; H. William Petry

[57] ABSTRACT

Improved apparatus for coating cords which may have knots or other enlargements in them, having means for detecting knots and means for increasing the effective size of the entrance for cord to the coating chamber to allow the knots to enter.

7 Claims, 14 Drawing Figures

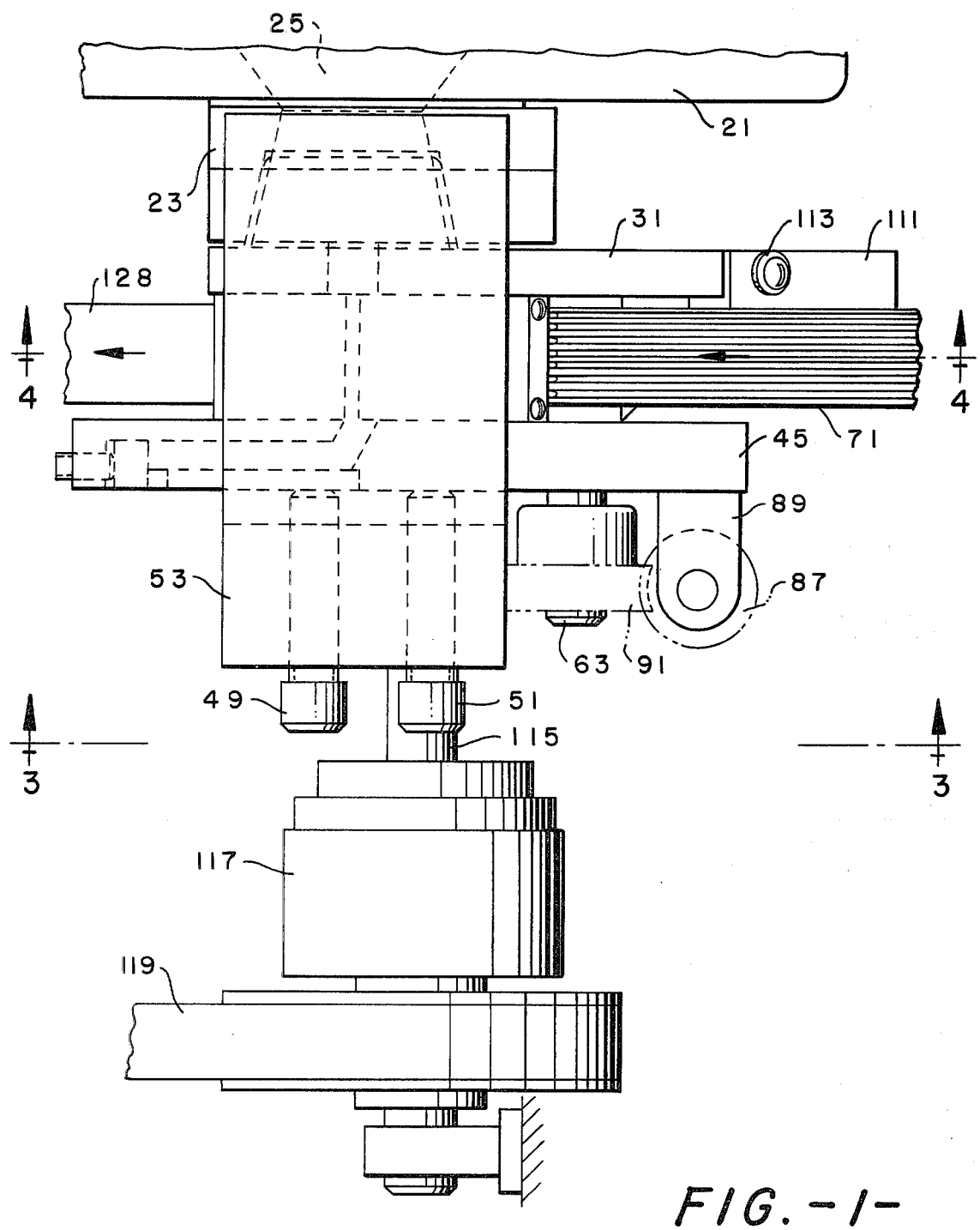
FIG.-1-

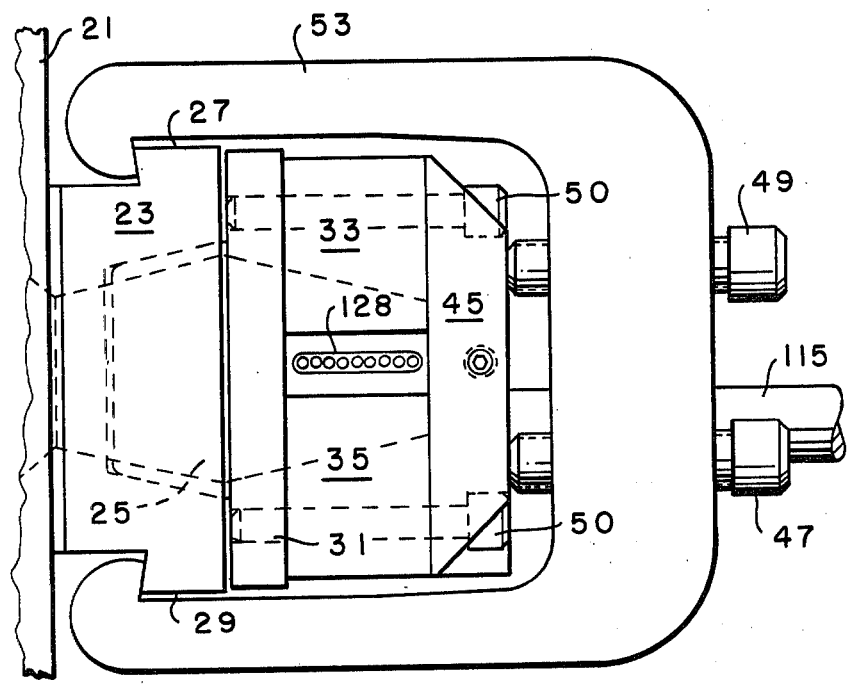
FIG.-2-
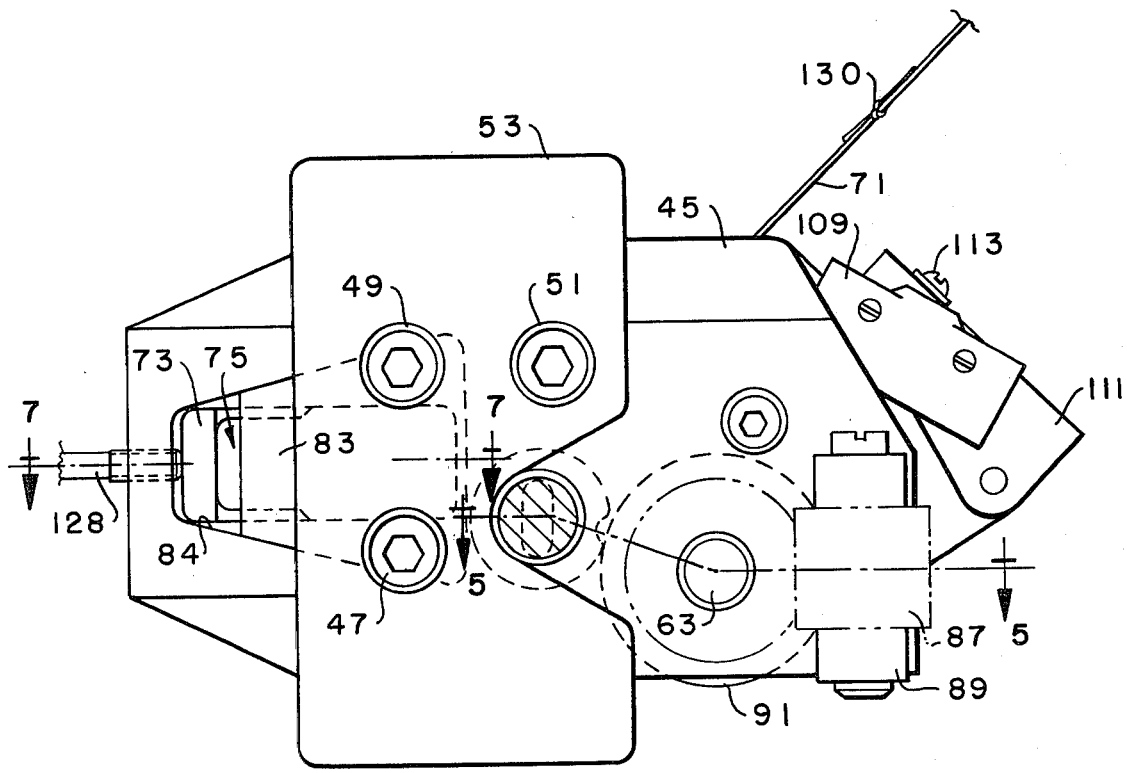
FIG.-3-

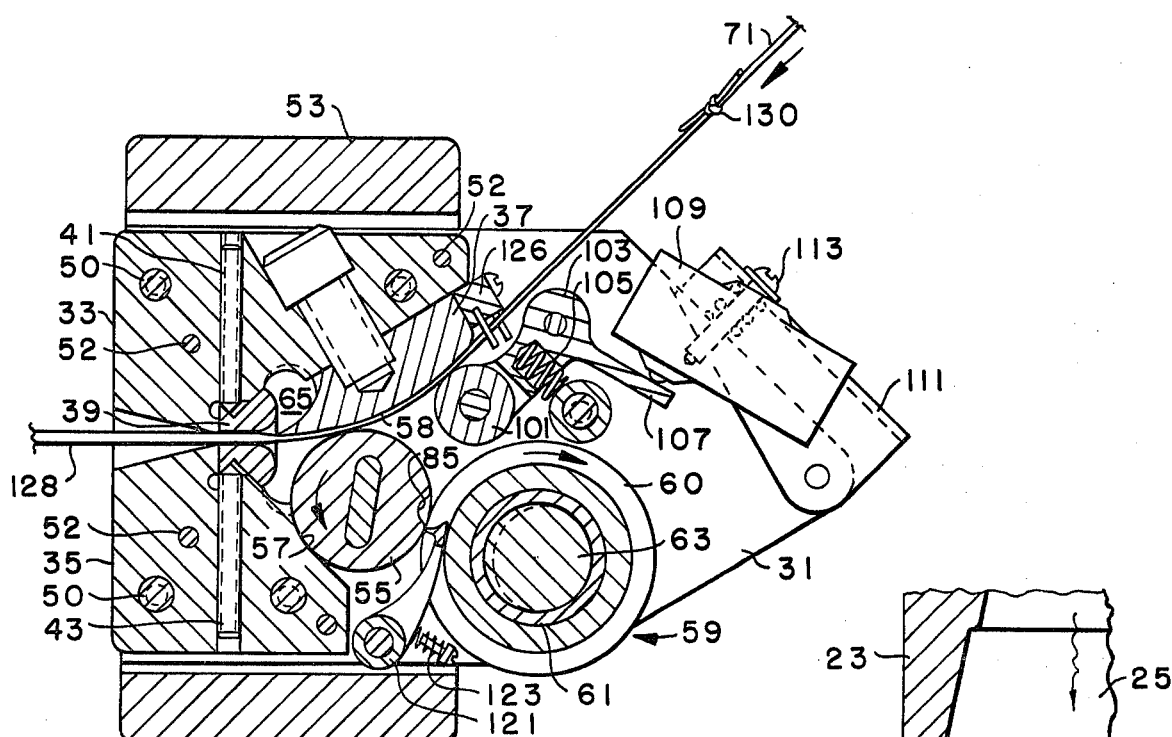
FIG.-4-
FIG.-5-
FIG.-7-
FIG.-6-

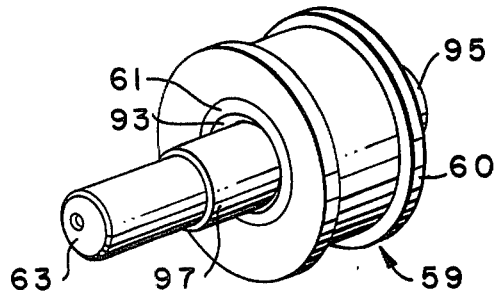
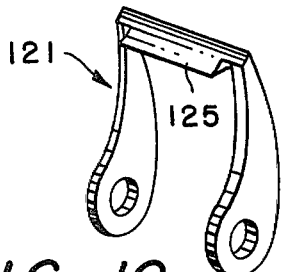
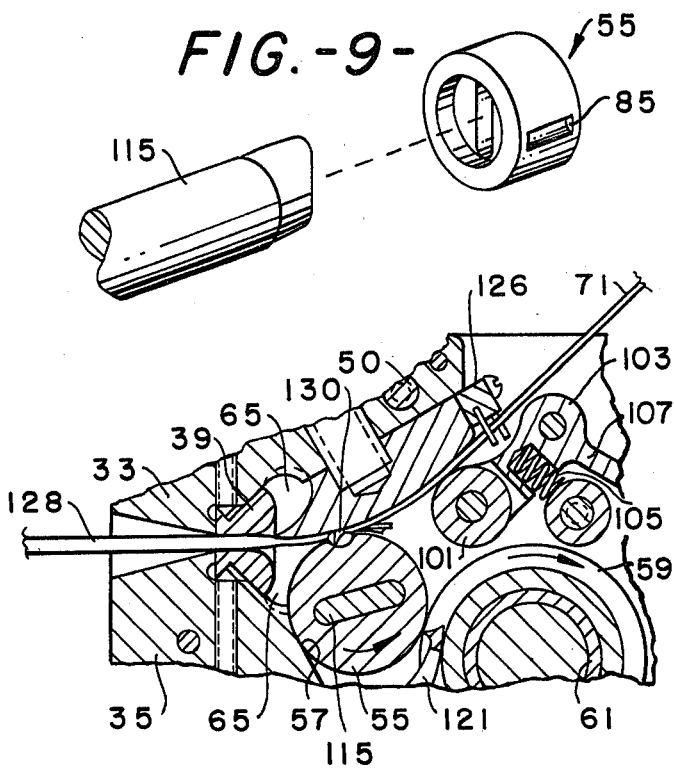
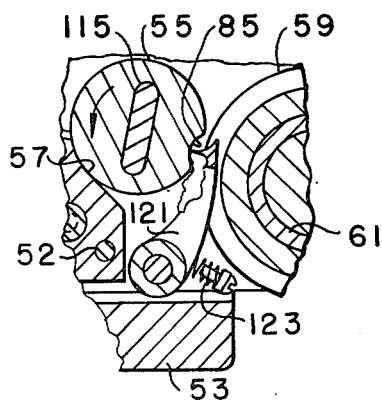
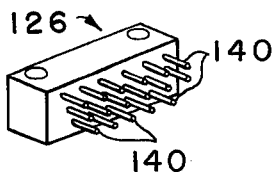
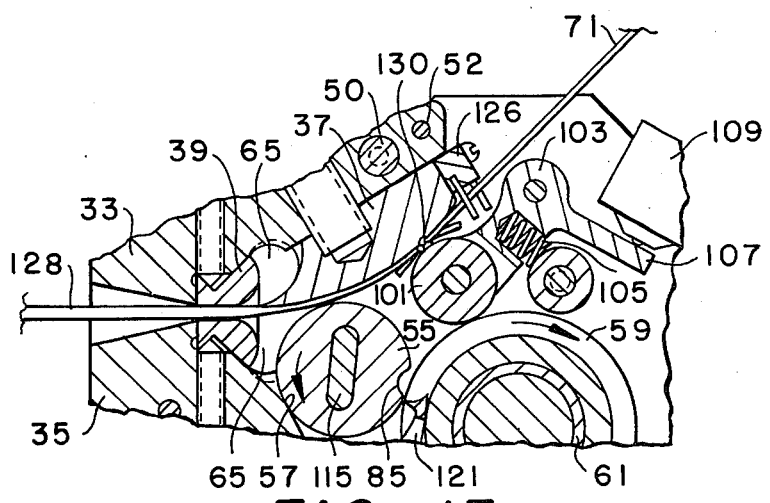

KNOT PASSING COATING APPARATUS

Belted radials are beginning to dominate the tire industry. They offer improved handling, higher gas mileage and superior durability. Conventional belts for tires are formed from a single piece of fabric around the carcass of the tire as it is being built. Conventional belts therefore have an overlap or splice region and two rough edges, which often weaken the tire or cause it to be unbalanced. These deficiencies can be avoided by building unitary belts which are formed directly on the tire building drum and have no rough edges or overlap region. Unitary belts can be formed directly from tire cord as described in U.S. Pat. No. 3,422,874. However, it is often advantageous to extrude rubber over a spaced array of tire cords to form a strip which is then wound onto the tire building drum as described in U.S. Pat. No. 3,720,570. An apparatus for forming these strips is disclosed in U.S. Pat. No. 3,737,262. When this apparatus is used for coating steel tire cord, the steel cords are placed on rolls on a creel. When the cord on one roll is exhausted, a new roll is substituted and the new cord is butt welded to the old. By this means, the extrusion process can be continued indefinitely since the diameter of the butt welded section can be substantially the same as the diameter of the wire and thus the weld can pass through the die. However, when cords comprised of textile fibers rather than steel are being coated, joining by knotting or splicing often results in an enlarged section which will not pass through the coating die. The present invention concerns an improved coating apparatus which is capable of handling cords with enlargements such as knots.

BRIEF DESCRIPTION OF THE DRAWINGS

The invention is best understood with reference to the drawings, in which:

FIG. 1 is a top view of one form of an improved extruder of the present invention attached to a conventional rubber extruder;

FIG. 2 is a left elevation of the device shown in FIG. 1;

FIG. 3 is a sectional view taken along line 3—3 in FIG. 1;

FIG. 4 is a sectional view taken along line 4—4 in FIG. 1;

FIG. 5 is a sectional view taken along line 5—5 in FIG. 3;

FIG. 6 is a right-hand end view of the cord input guide;

FIG. 7 is a sectional view taken along line 7—7 in FIG. 3;

FIG. 8 is a perspective view of the back-up roll and eccentric shaft;

FIG. 9 is a perspective view of the notched roll and its drive shaft;

FIG. 10 is a perspective view of the cleaning finger;

FIG. 11 illustrates the operation of the cleaning finger;

FIGS. 12-13 are fragmentary views of FIG. 4 showing the operation of the die as it passes a knot and cleans itself.

FIG. 14 is a perspective view of the cord input spacing comb.

DETAILED DESCRIPTION OF THE DRAWINGS

As shown in FIGS. 1-4, the coating apparatus includes an extruder 21 which supplies hot molten rubber under pressure. Manifold extension 23 mounted on extruder 21 has rubber passage 25 formed therein and has flanges 27 and 29 formed on the top and bottom of its exterior. Back plate 31 is held against manifold extension 23 while upper and lower extrusion chamber spacer blocks 33 and 35 and grooved cord guide 37 are all positioned between back plate 31 and front plate 45. Die insert 39 is positioned and held between upper and lower extrusion chamber spacer blocks 33 and 35 by set screws 41 and 43 and is horizontally confined by back plate 31 and front plate 45 which presses against upper and lower extrusion chamber spacer blocks 33 and 35 and against grooved cord guide 37. To facilitate assembly and alignment cap screws 50 are provided to hold extrusion chamber spacer blocks 33 and 35, extrusion chamber cord guide 37 and front plate 45 in place to form a unit which can be coupled to manifold extension 23 and held in place by U-bracket 53 which grips flanges 27 and 29. Both cap screws 50 and pins 52 pass through front plate 45, through the various spacers around extrusion chamber 65 and into back plate 31. Cap screws 47 and 49 press against front plate 45 and against trapezoidal insert plate 83 and hold them in place against the pressure of the rubber while cap screw 51 presses against front plate 45.

As shown in FIGS. 4 and 5, notched roller 55 presses against bearing surface 57 machined in the face of lower extrusion chamber block 35 and also presses against grooved lower face 58 of cord guide 37. Notched roller 55 is held in position by back up roll 59 which is mounted on bearing 61 on eccentric shaft 63 which is journaled into back plate 31 and front plate 45. Extrusion chamber 65 is formed by the void surrounded by upper and lower extrusion chamber blocks 33 and 35; front and back plates 45 and 31; die insert 39; cord guide 37; and notched roller 55. As is shown in FIG. 6, extrusion chamber guide die 37 has grooves 69 formed in lower face 58. Since grooves 69 are normally filled with cord 71 and since notched die roller 55 presses against lower face 58 of extrusion chamber guide die 37, rubber is forced to exit through the aperture in die insert 39.

As shown in FIGS. 3 and 7, rubber is vented from the extrusion chamber to facilitate start up procedures and to purge impurities from the die chamber. Venting also helps to stabilize the pressure in the die chamber and the rate of flow of rubber while reducing the formation of stagnant regions in which rubber can harden.

The amount of rubber vented can be controlled by adjusting U-shaped vent regulating insert 73 within vent duct 75 formed in front plate 45. Vent duct 75 is formed by channel 77 which is cut into front plate 45 and communicates with aperture 79 which joins extrusion chamber 65. Trapezoidal insert plate 83 covers duct 75, rests within trapezoidal cut-out 84 in front plate 45, and is held in position by cap screws 47 and 49.

As shown in FIGS. 4 and 5, notched die roller 55, is pressed into position by back-up roll 59 which has flange portions 60 (shown in FIG. 8) at either end which press against notched die roll 55. As shown in FIG. 9, notch 85 in notched die roll 55 does not extend the entire length of notched die roll 55, but only so far as is necessary to accommodate knots in any of the incoming cords. The position and pressure of back-up roll 59 can be adjusted by rotating eccentric shaft adjusting worm 87 mounted on worm support bracket 89 mounted on front plate 45. When eccentric shaft adjusting worm 87 is rotated, eccentric shaft adjusting gear 91 is turned and thereby eccentric shaft 63 is rotated. As shown in FIGS. 5 and 8, eccentric shaft 63 has offset cylindrical center portion 93 and cylindrical end portions 95 and 97 journaled into front and back plates 31 and 45. Since the centerline of center portion 93 does not coincide with the common centerlines of end portions 95 and 97, rotation of eccentric shaft 63 about the centerline of end portions 95 and 97 moves the centerline which back-up roll 59 rotates about. Thus, by rotating worm 87, the required degree of pressure of back-up roll 59 against notched die roll 55 can be obtained while maintaining the freedom to rotate notched die roll 55.

As shown in FIG. 4, knot detector roll 101 is rotatably mounted on knot detector roll arm 103 which is pivotably mounted on back plate 31. Biasing spring 105 biases knot detector roll arm 101 in the clockwise direction against extrusion chamber guide die 37. When knot detector roll arm 103 is in the normal clockwise position finger 107 on knot detector roll arm 103 contacts but does not press against knot detector microswitch 109 which is adjustably mounted on knot detector mounting bracket 111 which is fixed to back plate 31. The position of knot detector microswitch 109 is adjusted by turning knot detector adjusting screw 113.

As shown in FIGS. 1, 5 and 9, notched roller 55 is driven by drive shaft 115 which is connected to the output of single revolution clutch 117 which is driven by timing belt 119 which takes power from any convenient source which is capable of driving the outer periphery of notched roller at a speed which is equal to the speed at which strip 128 is withdrawn. The input of single revolution clutch 117 is driven continuously but the output turns only one revolution each time the clutch is activated. Advantageously, cleaning finger 121 is pivotably mounted between back plate 31 and front plate 45 and is biased against notched die roller 55 by compression springs 123. As shown in FIGS. 10 and 11, cleaning finger 121 is a "U" shaped member having a blade portion 125 joining the legs of the "U". Blade portion 125 is adapted to gouge rubber out notch 85 of notched die roll 55 upon rotation of notched die roll 55.

Advantageously, cord input spacer comb 126 is mounted on cord guide 37 to aid in retaining each of cords 71 within its proper groove 69.

OPERATION

In normal operation, such as shown in FIG. 4, cords 71 from a creel (not shown) pass through cord input spacer comb 126, through grooves 69 in grooved cord guide 37 into extrusion chamber 65 where they are coated with rubber and emerge through die insert 39 as a strip 128 of rubber having cords 71 embedded in it. Leakage of rubber from extrusion chamber 65 through entrance grooves 69 is minimal since cords 71 substantially fill grooves 69 and since the smooth part at the surface of notched die roll 55 presses against the face of extrusion chamber guide die 59. Leakage through grooves 69 is further minimized by the motion of cords which tends to carry rubber back into extrusion chamber 65. When one of cords 71 has a knot or enlargement 130 in it, knot detector roll arm 103 is pivoted counter-clockwise by the knot as it passes between extrusion chamber guide die and knot detector roll 101. As shown in FIG. 13 when knot detector roll arm 103 is pivoted counter clockwise, finger 107 presses against microswitch 109 which activates single revolution clutch 117. Since the input of single revolution clutch 117 is always turning, activation of single revolution clutch 117 causes drive shaft 115 to rotate, causing notched die roll 55 to rotate counter-clockwise 360°. Advantageously, the speed of notch 85 of notched die roll 55 is substantially equal to the speeds of cords 71 and the linear distance along the periphery of notched die roll 55 from the normal position of notch 85 to the point of contact between notched die roll 55 and extrusion chamber guide die 59 is substantially equal to the distance from the point of contact between knot detector roll 101 and extrusion chamber guide die 37 to the point of contact between notched die roll 55 and extrusion chamber guide die 37. In any event, knot 130 and notch 85 should arrive at the face of extrusion chamber guide die 37 simultaneously so knot 130 will be carried into extrusion chamber 65 by notch 85 as shown in FIG. 12. Thus, the entrance to extrusion chamber 65 is enlarged momentarily to allow knot 130 to enter. As shown in FIG. 11, when notched die roll 55 completes its revolution, it encounters cleaning finger 121 which gouges accumulated rubber out of notch 85 prior to notched die roll 55 returning to its normal "ready" positions.

Cord input spacing comb 126 is attached to upper extrusion chamber spacer block 37 to prevent any of cords 71 from jumping from its respective groove 69 during operation. As shown in FIG. 14, cord input spacing comb 126 has a plurality of spacing fingers 140 which are used to separate cords 71.

As my invention, I claim:

1. An improved cord coating apparatus of the type having:
    housing means defining an extrusion chamber, said chamber having a cord entrance means, a coating material entrance means and an exit means for coated cord;
    means for supplying cord to the cord entrance means to said extrusion chamber;
    means for supplying coating material to said coating material entrance means to said extrusion chamber; and
    means for withdrawing coated cord from said exit;
    means wherein the improvement comprises:
    means for detecting sudden enlargements in said cord; and
    means operatively associated with said means for detecting sudden enlargements for increasing the effective size of the cord entrance means to said extrusion chamber at the time of arrival of said enlargement of said cord entrance means to allow said enlargement to enter said extrusion chamber and be coated by said coating material.

2. The apparatus of claim 1, wherein said cord entrance means comprises a cord guide member having a surface having a face portion having at least one groove formed therein, and a notched member having a surface having a smooth portion and a recessed portion, said smooth portion and said recessed portion of the surface of said notched member being alternatley engageable to said face portion of the surface of said cord guide member; and wherein said means for increasing the effective size of the cord entrance means to said extrusion chamber includes means for moving said recessed portion of the face portion of said notched member into engagement with said face portion of the surface of said cord guide member.

3. The apparatus of claim 2 wherein said notched member is a substantially cylindrical roll member having a smooth surface having notch, said notch being substantially parallel to the axis of said cylinder and wherein said means for moving said recessed portion of the face of said notched member into engagement with said face portion of the surface of said cord guide member includes means for rotating said roll member about its axis so that the speed of the notching said roll member is substantially equal to the speed with which coated cord is withdrawn from said apparatus.

4. The apparatus of claim 3 wherein said means for rotating said roll member about its axis includes single revolution clutch means.

5. The apparatus of claim 4 further comprising means for cleaning said notch in said cylindrical roll after said enlargement has entered said extrusion chamber.

6. Improved apparatus for coating cord of the type having:
 a frame,
 housing means mounted on said frame defining an extrusion chamber, said chamber having a cord entrance means, a coating material entrance means and an exit means for coated cord; means for supplying cord to the cord entrance means to said extrusion chamber
 means for supplying coating material to said coating material entrance means to said extrusion chamber, and means for withdrawing coated cord from said exit means, wherein the improvement comprises:
 said cord entrance means including a cord guide member having a face having at least one groove therein and a notched roll rotably mounted on said frame having a notch substantially parallel to the axis of rotation of said roll, the surface of said roll engaging the face of said cord guide member,
 a backup shaft rotably mounted on said frame, said shaft having a substantially cylindrical off-set portion and two substantially cylindrical end portions, the centerlines of said end portions coinciding and the centerline of said offset portion being substantially parallel to the centerline of said end portions but not coinciding therewith;
 a backup roll having a substantially cylindrical surface rotably mounted on said backup shaft, the axis of rotation of said backup roll being substantially parallel to the axis of rotation of said notched roll, the axis of rotation of said backup roll coinciding with the centerline of said center portion, said backup roll urging said notched roll into engagement with the face of said cord guide member;
 means for rotating said backup shaft about the centerline of its end portions and maintaining the position of said backup shaft whereby the pressure of said notched roll on said cord guide may be varied;
 means for detecting sudden enlargements in said cord;
 means operably associated with said means for detecting sudden enlargements in said cord for rotating said notched roll and to cause said notch in said notched roll to coincide with said enlargement and to allow enlargements to enter said extrusion chamber and be coated by said coating material, said means including single revolution clutch means.

7. Improved apparatus for coating cord of the type having:
 a frame,
 housing means mounted on said frame defining an extrusion chamber, said chamber having a cord entrance means, a coating material entrance means and an exit means for coated cord; means for supplying cord to the cord entrance means to said extrusion chamber
 means for supplying coating material to said coating material entrance means to said extrusion chamber, and means for withdrawing coated cord from said exit means, wherein the improvement comprises:
 said cord entrance means including a cord guide member having a face having at least one groove therein and a notched roll rotably mounted on said frame having a notch substantially parallel to the axis of rotation of said roll, the surface of said roll engaging the face of said cord guide member,
 means for detecting sudden enlargements in said cord;
 means operably associated with said means for detecting sudden enlargements in said cord for rotating said notched roll and to cause said notch in said notched roll to coincide with said enlargement and to allow enlargements to enter said extrusion chamber and be coated by said coating material said means including single revolution clutch means.

* * * * *

UNITED STATES PATENT OFFICE
CERTIFICATE OF CORRECTION

Patent No. 4,308,823  Dated January 5, 1982

Inventor(s) Norman E. Klein

It is certified that error appears in the above-identified patent and that said Letters Patent are hereby corrected as shown below:

Column 2, 19, after "50" insert --and pins 52--.

Signed and Sealed this

Fifteenth Day of June 1982

[SEAL]

Attest:

Attesting Officer

GERALD J MOSSINGHOFF

Commissioner of Patents and Trademarks